US005831195A

United States Patent [19]

Nakata

[11] Patent Number: 5,831,195

[45] Date of Patent: Nov. 3, 1998

[54] AUTOMATIC PERFORMANCE DEVICE

[75] Inventor: Takuya Nakata, Hamamatsu, Japan

[73] Assignee: Yamaha Corporation, Hamamatsu, Japan

[21] Appl. No.: 577,771

[22] Filed: Dec. 19, 1995

[30] Foreign Application Priority Data

Dec. 26, 1994 [JP] Japan .................................... 6-336652

[51] Int. Cl.[6] ................................ G01H 1/18; G01H 1/36

[52] U.S. Cl. ................................ 84/609; 84/604; 84/610; 84/615; 84/634

[58] Field of Search ..................... 84/604–606, 609–614, 84/615–620, 634–636

[56] References Cited

U.S. PATENT DOCUMENTS

| | | | |
|---|---|---|---|
| 4,930,390 | 6/1990 | Kellogg et al. . | |
| 5,101,707 | 4/1992 | Kondo . | |
| 5,340,939 | 8/1994 | Kumagai | 84/609 |
| 5,481,066 | 1/1996 | Kitamura | 84/637 |
| 5,508,471 | 4/1996 | Shimada | 84/610 |

FOREIGN PATENT DOCUMENTS

| | | |
|---|---|---|
| 4-37440 | 6/1992 | Japan . |

*Primary Examiner*—John W. Cabeca
*Assistant Examiner*—Marlon T. Fletcher
*Attorney, Agent, or Firm*—Graham & James LLP

[57] ABSTRACT

An automatic performance device includes a memory for storing automatic performance data (including accompaniment-related data) for a plurality of performance parts and automatic accompaniment data, performance and accompaniment sections for reading out the automatic performance data and automatic accompaniment data respectively to execute performance based on the respective read-out data, and a mute section for muting a performance for at least one of the performance parts of the automatic performance data when the accompaniment section executes the performance based on the automatic accompaniment data. The device may includes a style data storage section for storing automatic accompaniment pattern data for each of a plurality of performance styles, a performance data storage section for storing automatic performance data containing pattern designation information designating a performance style to be used, a first performance section for reading out the automatic performance data to execute a performance based on the read-out data, a conversion section for converting the read-out pattern designation information into other pattern designation information, and a second performance section for reading out the accompaniment pattern data in accordance with the other pattern designation information so as to execute a performance based on the read-out data.

12 Claims, 10 Drawing Sheets

AUTOMATIC PERFORMANCE DEVICE

BACKGROUND OF THE INVENTION

The present invention relates to automatic performance devices such as sequencers having an automatic accompaniment function, and more particularly to an automatic performance device which can easily vary arrangement of a music piece during an automatic performance.

Sequencer-type automatic performance devices have been known which have memory storing sequential performance data prepared for each of a plurality of performance parts and executes automatic performance of a music piece by sequentially reading out the performance data from the memory in accordance with the progress of the music piece. The performance parts are a melody part, rhythm part, bass part, chord part, etc.

Other-type automatic performance devices have also been known which, for some of the rhythm, bass and chord parts, execute automatic accompaniment on the basis of accompaniment pattern data stored separately from sequential performance data. Of such automatic performance devices, there are ones where pattern numbers are set in advance by header information or by use of predetermined operating members to indicate which of the accompaniment data are used to execute an automatic accompaniment, and others which employ accompaniment-pattern designation data containing the pattern numbers in order of the predetermined progression of a music piece (e.g., Japanese patent publication No. HEI 4-37440). Tones for the bass and chord parts are typically converted, on the basis of chord progression data or a chord designated by a player via a keyboard, into tones suitable for the chord.

However, the conventionally-known automatic performance devices which execute automatic performance for all the performance parts in accordance with the sequential performance data are disadvantageous in that the executed performance tends to become monotonous because the same performance is repeated every time as in tape recorders. The only way to vary the arrangement of the performance in such automatic performance devices was to edit the performance data directly. But, editing the performance data was very difficult to those people unfamiliar with the contents of the performance data.

The prior automatic performance devices of the type where some of the performance parts are performed by automatic accompaniment are advantageous in that they can be handled easily even by beginners, because the arrangement of a music piece can be altered simply by only changing the pattern numbers designating accompaniment pattern data. However, to this end, the automatic performance devices must themselves have an automatic accompaniment function; the pattern numbers are meaningless data for those automatic performance devices having no automatic accompaniment function, and hence the devices could not effect arrangement of a music piece on the basis of the pattern numbers. Further, even where the performance data containing data for all the performance parts are performed by the automatic performance devices having an automatic accompaniment function, the arrangement of a music piece could not be varied.

SUMMARY OF THE INVENTION

It is therefore an object of the present invention to provide an automatic performance device which can easily vary the arrangement of a music piece with no need for editing performance data.

In order to accomplish the above-mentioned object, an automatic performance device according to a first aspect of the present invention comprises a storage section for storing first automatic performance data for a plurality of performance parts and second automatic performance data for at least one performance part, a first performance section for reading out the first automatic performance data from the storage section to execute a performance based on the first automatic performance data, a second performance section for reading out the second automatic performance data from the storage section to execute a performance based on the second automatic performance data, and a mute section for muting the performance for at least one of the performance parts of the first automatic performance data when the second performance section executes the performance based on the second automatic performance data.

In the automatic performance device arranged in the above-mentioned manner, the storage section stores the first automatic performance data for a plurality of performance parts (e.g., melody, rhythm, bass and chord parts) and the second automatic performance data for at least one performance part. For instance, the first automatic performance data may be sequence data which are prepared sequentially in accordance with the predetermined progression of a music piece, while the second automatic performance data may be accompaniment pattern data for performing an accompaniment performance by repeating an accompaniment pattern. The first performance section reads out the first automatic performance data from the storage section to execute an automatic performance based on the read-out data, during which time the second performance section repeatedly reads out the second automatic performance data from the storage section to execute a performance based on the readout data. In such a case, the performance parts of the first and second performance sections may sometimes overlap, or the performances by the first and second performance sections may not be compatible with each other. Therefore, the mute section mutes a performance for at least one of the performance parts of the first automatic performance data executed by the first performance section, so as to treat the performance by the second performance section with priority. Thus, the arrangement of a music piece can be varied easily by only changing the automatic performance executed by the second performance section.

An automatic performance device according to a second aspect of the present invention comprises a style data storage section for storing automatic accompaniment pattern data for each of a plurality of performance styles, a performance data storage section for storing automatic performance data containing pattern designation information that designates which of the performance styles are to be used, a first performance section for reading out the automatic performance data from the performance data storage section to execute a performance based on the automatic performance data, a conversion section for converting the pattern designation information read out by the first performance section into other pattern designation information, and a second performance section for reading out the automatic accompaniment pattern data from the style data storage section in accordance with the other pattern designation information converted by the conversion section, to execute a performance based on the automatic accompaniment pattern data.

In the automatic performance device according to the second aspect of the invention, the style data storage section stores automatic accompaniment pattern data for each of a plurality of performance styles (e.g., rhythm types such as rock and waltz), and the performance data storage section stores automatic performance data containing pattern designation information that designates which of the performance styles are to be used. Namely, the automatic performance data is data prepared sequentially in accordance with the predetermined progression of a music piece, and the pattern designation information is stored in the performance data storage section as part of the sequential data. Thus, the first performance section reads out the automatic performance data from the performance data storage section to execute an automatic performance, during which time the second performance section repeatedly reads out the automatic accompaniment pattern data from the storage section to execute an automatic accompaniment performance. At that time, the pattern designation information read out by the first performance section is converted into other pattern designation information by the conversion section. Thus, the arrangement of a music piece can be varied easily by only changing the manner in which the conversion section converts the pattern designation information.

The present invention also provides a method of processing automatic performance data to execute an automatic performance by reading out data from a storage device storing first automatic performance data for first and second performance parts, which comprising the steps of performing the first and second performance parts on the basis of the first automatic performance data when the automatic performance data stored in the storage device is read out and processed by a first-type automatic performance device capable of processing only the first automatic performance data, and performing the first performance part on the basis of the first automatic performance data and also performing the second performance part on the basis of the second automatic performance data when the automatic performance data stored in the storage device is read out and processed by a second-type automatic performance device capable of processing the first and second automatic performance data.

According to the method, the storage device stores first automatic performance data for first and second performance parts and second automatic performance data for the same performance part as the second performance part. The first automatic performance data is data prepared sequentially in accordance with the predetermined progression of a music piece, while the second automatic performance data is accompaniment pattern data. Automatic performance devices, in general, include one automatic performance device which reads out only the first automatic performance data from the storage device to execute an automatic performance process (first-type automatic performance device) and another automatic performance device which reads out both the first automatic performance data and the second automatic performance data from the storage device to execute an automatic performance process (second-type automatic performance device). Thus, with this method, when the automatic performance data stored in the storage device is read out and processed by the first-type automatic performance device, an automatic performance is executed for the first and second performance parts on the basis of the first automatic performance data. On the other hand, when the automatic performance data stored in the storage device is read out and processed by the second-type automatic performance device, an automatic performance is executed for the second performance part on the basis of the second automatic performance data. Accordingly, where an automatic performance process is executed by the second-type automatic performance device, the arrangement of a music piece can be varied easily by only changing the contents of the second automatic performance data.

For better understanding of the above and other features of the present invention, the preferred embodiments of the invention will be described in detail below with reference to the accompanying drawings.

DETAILED DESCRIPTION OF THE PREFERRED EMBODIMENTS

Figure 1:
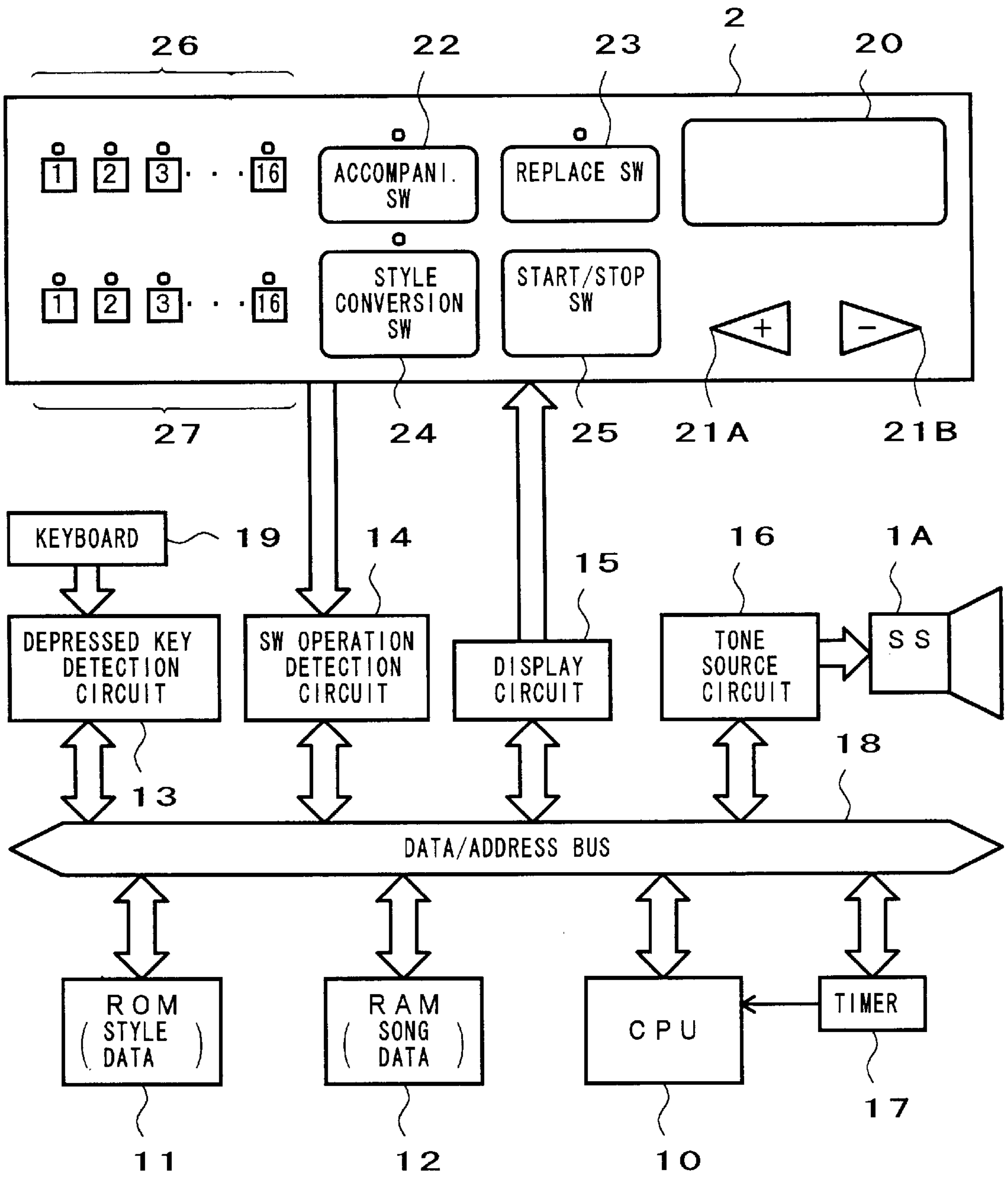
FIG. 1 is a block diagram illustrating the general hardware structure of an embodiment of an electronic musical instrument to which is applied an automatic performance device according to the present invention.

FIG. 1 is a block diagram illustrating the general hardware structure of an embodiment of an electronic musical instrument to which is applied an automatic performance device of the present invention. In this embodiment, various processes are performed under the control of a microcomputer, which comprises a microprocessor unit (CPU) 10, a ROM 11 and a RAM 12.

For convenience, the embodiment will be described in relation to the electronic musical instrument where an automatic performance process, etc. are executed by the CPU 10. This embodiment is capable of simultaneously generating tones for a total of 32 channels, 16 as channels for sequencer performance and other 16 as channels for accompaniment performance.

The microprocessor unit or CPU 10 controls the entire operation of the electronic musical instrument. To this CPU 10 are connected, via a data and address bus 18, the ROM 11, RAM 12, depressed key detection circuit 13, switch operation detection circuit 14, display circuit 15, tone source circuit 16 and timer 17.

The ROM 11 prestores system programs for the CPU 10, style data of automatic performance, and various tone-related parameters and data.

The RAM 12 temporarily stores various performance data and other data occurring as the CPU 10 executes the programs, and is provided in predetermined address regions of a random access memory (RAM) for use as registers and flags. This RAM 12 also prestores song data for a plurality of music pieces and a style/section converting table for use in effecting arrangement of music pieces.

Figure 2A:
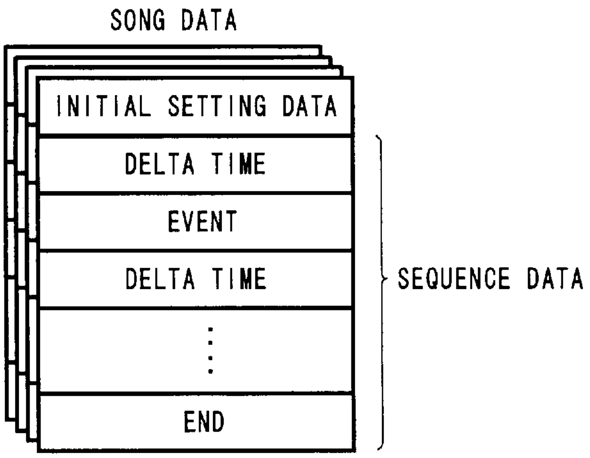
FIG. 2A is a view illustrating an example format of song data for a plurality of music pieces stored in a RAM of FIG. 1.
Figure 2B:
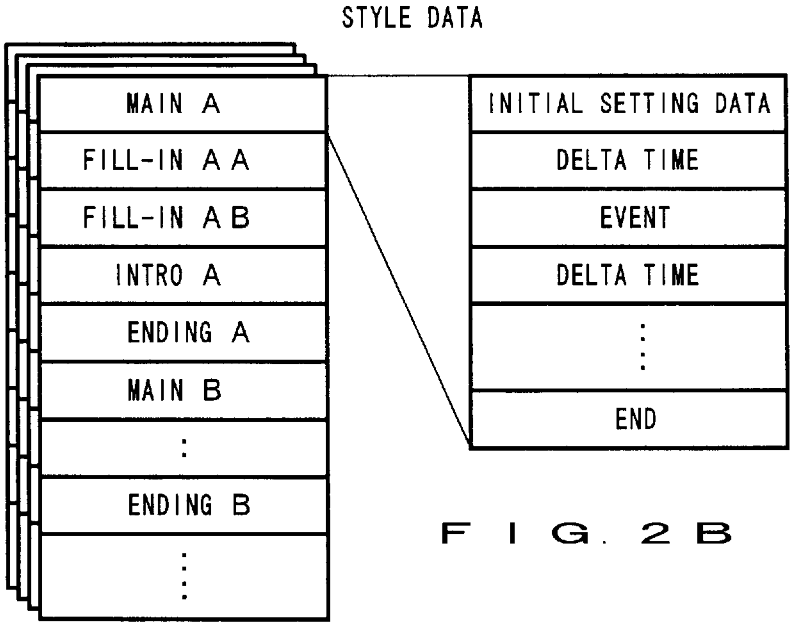
FIG. 2B is a view illustrating an example format of style data stored in a ROM of FIG. 1.
Figure 2C:
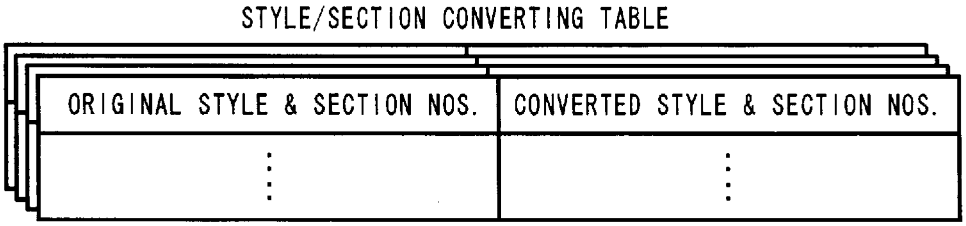
FIG. 2C is a view illustrating the contents of a style/section converting table stored in the RAM.

FIG. 2A illustrates an example format of song data for a plurality of music pieces stored in the RAM 12, FIG. 2B illustrates an example format of style data stored in the ROM 11, and FIG. 2C illustrates the contents of the style/section converting table stored in the RAM 12.

As shown in FIG. 2A, the song data for each piece of music comprises initial setting data and sequence data. The initial setting data includes data indicative of the title of each music piece, tone color of each channel, name of each performance part and initial tempo. The sequence data includes sets of delta time data and event data and end data. The delta time data indicates a time between events, and the event data includes data indicative of a note or other performance event, style/section event, chord event, replace event, style mute event, etc.

The note event data includes data indicative of one of channels numbers "1" to "16" (corresponding to MIDI channels in the tone source circuit 16) and a note-on or note-off event for that channel. Similarly, the other performance data includes data indicative of one of channels numbers "1" to "16", and volume or pitch bend for that channel.

In this embodiment, each channel of the sequence data corresponds to one of predetermined performance parts including a melody part, rhythm part, bass part, chord backing part and the like. Tone signals for the performance parts can be generated simultaneously by assigning various events to the tone generating channels of the tone source circuit 16. Although an automatic performance containing the rhythm, bass and chord backing parts can be executed only with the sequence data, the use of later-described style data can easily replace performance of these parts with other performance to thereby facilitate arrangement of a composition involving an automatic accompaniment.

The style/section event data indicates a style number and a section number, and the chord event data is composed of root data indicative of the root of a chord and type data indicative of the type of the chord. Replace event data is composed of data indicative of a sequencer channel (channel number) to be muted in executing an accompaniment performance and having 16 bits corresponding to the 16 channels, with logical "0" representing that the corresponding channel is not to be muted and logical "1" representing that the corresponding channel is to be muted. Style mute event data is composed of data indicative of an accompaniment channel (channel number) to be muted in executing an accompaniment performance and having 16 bits corresponding to the 16 channels similarly to the replace event data.

Where an automatic performance device employed has no automatic accompaniment function, the above-mentioned style/section event, chord event, replace event and style mute event are ignored, and an automatic performance is carried out only on the basis of note event and other performance event data. However, in the automatic performance device of the embodiment having an automatic accompaniment function, all of the above-mentioned event data are utilized.

As shown in FIG. 2B, the style data comprises one or more accompaniment patterns per performance style (such as rock or waltz). Each of such accompaniment patterns is composed of five sections which are main, fill-in A, fill-in B, intro and ending sections. FIG. 2B shows a performance style of style number "1" having two accompaniment patterns, pattern A and pattern B. The accompaniment pattern A is composed of main A, fill-in AA, fill-in AB, intro A and ending A sections, while the accompaniment pattern B is composed of main B, fill-in BA, fill-in BB, intro B and ending B sections.

Thus, in the example of FIG. 2B, section number "1" corresponds to main A, section number "2" to fill-in AA, section number "3" to fill-in AB, section number "4" to intro A, section number "5" to ending A, section number "6" to main B, section number "7" to fill-in BA, section number "8" to fill-in BB, section number "9" to intro B, and section number "10" to ending B. Therefore, for example, style number "1" and section number "3" together designates fill-in AB, and style number "1" and section number "9" together designates intro B.

Each of the above-mentioned sections includes initial setting data, delta time data, event data and end data. The initial setting data indicates the name of tone color and performance part of each channel. Delta time data indicates a time between events. Event data includes any one of accompaniment channel numbers "1" to "16" and data indicative of note-on or note-off, note number, velocity etc. for that channel. The channels of the style data correspond to a plurality of performance parts such as rhythm, bass and chord backing parts. Some or all of these performance parts correspond to some of the performance parts of the above-mentioned sequence data. One or more of the performance parts of the sequence data can be replaced with the style data by muting the corresponding channels of the sequence data on the basis of the above-mentioned replace event data, and this allows the arrangement of an automatic accompaniment music piece to be easily altered.

Further, as shown in FIG. 2C, the style/section converting table is a table where there are stored a plurality of original style and section numbers and a plurality of converted (after-conversion) style and section numbers corresponding to the original style and section numbers. This style/section converting table is provided for each of the song data, and is used to convert, into converted style and section numbers, style and section numbers of style/section event data read out as event data of the song data, when the read-out style and section numbers correspond to any one pair of the original style/section numbers contained in the table. Thus, by use of the converting table, the accompaniment style etc. can be easily altered without having to change or edit the contents of the song data.

The style/section converting table may be either predetermined for each song or prepared by a user. The original style/section numbers in the converting table must be included in the sequence data, and hence when the user prepares the style/section converting table, it is preferable to display, on an LCD 20 or the like, style/section data extracted from the sequence data of all the song data so that the converted style and section numbers are allocated to the displayed style/sections. Alternatively, a plurality of such style/section converting tables may be provided for each song so that any one of the tables is selected as desired by the user. All the style and section numbers contained in the song data need not be converted into other style and section numbers; some of the style and section numbers may remain unconverted.

The keyboard 19 is provided with a plurality of keys for designating the pitch of each tone to be generated and includes key switches corresponding to the individual keys. If necessary, the keyboard 19 may also include a touch detection means such as a key depressing force detection device. Although described here as employing the keyboard 19 that is a fundamental performance operator relatively easy to understand, the embodiment may of course employ any performance operating member other than the keyboard 19.

The depressed key detection circuit 13 includes key switch circuits that are provided in corresponding relations to the pitch designating keys of the keyboard 19. This depressed key detection circuit 13 outputs a key-on event signal upon its detection of a change from the released state to the depressed state of a key, and a key-off event signal upon its detection of a change from the depressed state to the released state of a key. At the same time, the depressed key detection circuit 13 outputs a key code (note number) indicative of the key corresponding to the key-on or key-off event signal. The depressed key detection circuit 13 also determines the depression velocity or force of the depressed key so as to output velocity data and after-touch data.

The switch operation detection circuit 14 is provided, in corresponding relations to operating members (switches) provided on the operation panel 2, for outputting, as event information, operation data responsive to the operational state of the individual operating members.

The display circuit 15 controls information to be displayed on the LCD 20 provided on the operation panel 2 and the respective operational states (i.e., lit, turned-OFF and blinking states) of LEDs provided on the panel 20 in corresponding relations to the operating members. The operating members provided on the operation panel 2 include song selection switches 21A and 21B, accompaniment switch 22, replace switch 23, style conversion switch 24, start/stop switch 25, sequencer channel switches 26 and accompaniment channel switches 27. Although various other operating members than the above-mentioned are provided on the operation panel 2 for selecting, setting and controlling the tone color, volume, pitch, effect etc. of each tone to be generated, only those directly associated with the present embodiment will be described hereinbelow.

The song selection switches 21A and 21B are used to select the name of a song to be displayed on the LCD 20. The accompaniment switch 22 activates or deactivates an automatic accompaniment performance. The style conversion switch 24 activates or deactivates a style conversion process based on the style/section converting table. The replace switch 23 sets a mute or non-mute state of a predetermined sequencer channel, and the start/stop switch 25 starts or stops an automatic performance. The sequencer channel switches 26 selectively set a mute or non-mute state to the corresponding sequencer channels. The accompaniment channel switches 27 selectively set a mute/non-mute state to the corresponding automatic accompaniment channels. The LEDs are provided in corresponding relations to the individual sequencer and accompaniment channel switches 26 and 27 adjacent to the upper edges thereof, in order to display the mute or non-mute states of the corresponding channels.

The tone source circuit 16 may employ any of the conventionally-known tone signal generation systems, such as the memory readout system where tone waveform sample value data prestored in a waveform memory are sequentially read out in response to address data varying in accordance with the pitch of tone to be generated, the FM system where tone waveform sample value data are obtained by performing predetermined frequency modulation using the above-mentioned address data as phase angle parameter data, or the AM system where tone waveform sample value data are obtained by performing predetermined amplitude modulation using the above-mentioned address data as phase angle parameter data.

Each tone signal generated from the tone source circuit 16 is audibly reproduced or sounded via a sound system 1A (comprised of amplifiers and speakers).

The timer 17 generates tempo clock pulses to be used for counting a time interval and for setting an automatic performance tempo. The frequency of the tempo clock pulses is adjustable by a tempo switch (not shown) provided on the operation panel 2. Each generated tempo clock pulse is given to the CPU 10 as an interrupt command, and the CPU 10 in turn executes various automatic performance processes as timer interrupt processes. In this embodiment, it is assumed the frequency is selected such that 96 tempo clock pulses are generated per quarter note.

It should be obvious that data may be exchanged via a MIDI interface, public communication line or network, FDD (floppy disk drive), HDD (hard disk drive) or the like rather than the above-mentioned devices.

Now, various processes performed by the CPU 10 in the electronic musical instrument will be described in detail on the basis of the flowcharts shown in FIGS. 3 to 13.

Figure 3:
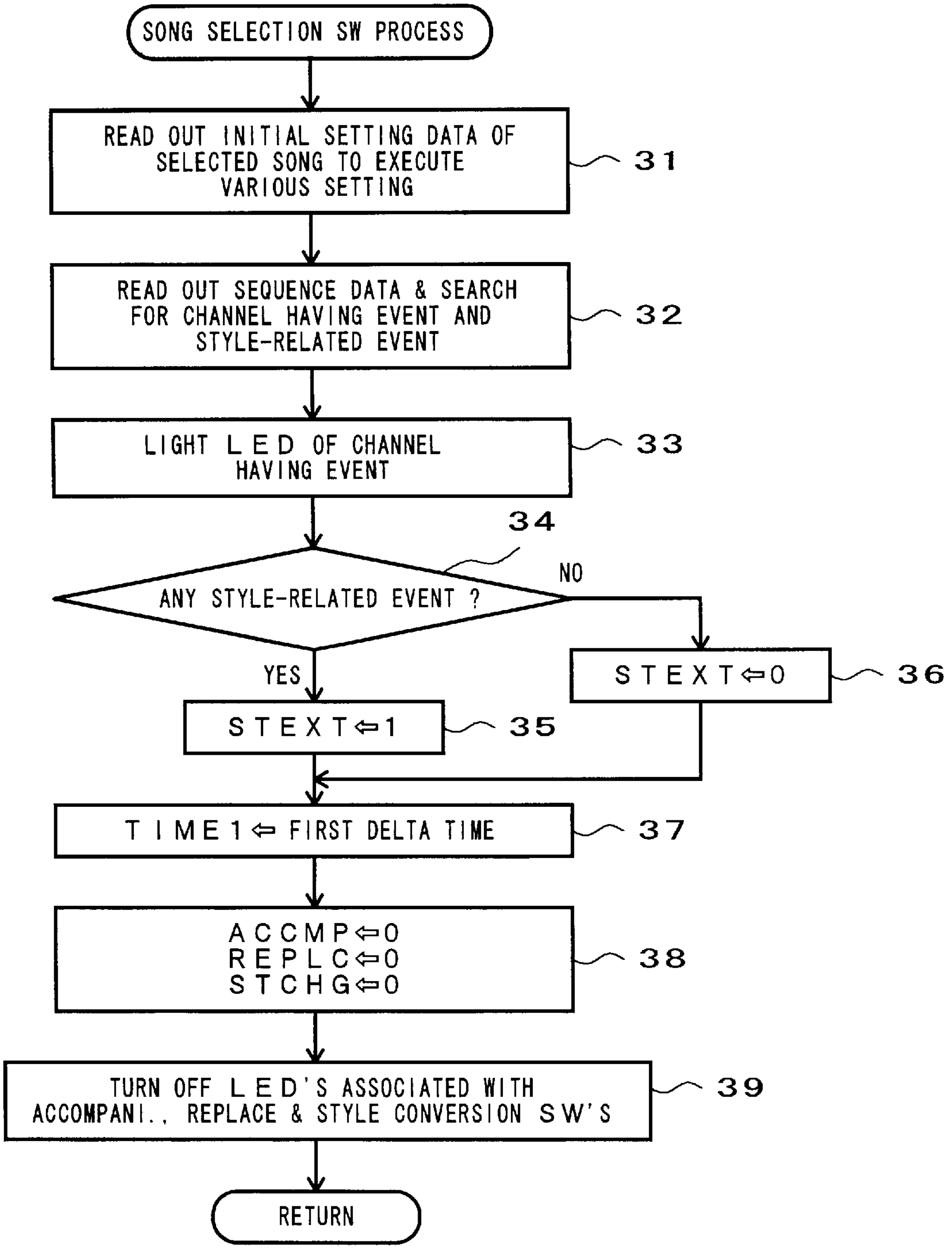
FIG. 3 is a flowchart illustrating an example of a song selection switch process performed by a CPU of the electronic musical instrument of FIG. 1 when a song selection switch is activated on an operation panel to select song data from among those stored in the RAM.

FIG. 3 illustrates an example of a song selection process performed by the CPU 10 of FIG. 1 when the song selection switch 21A or 21B on the operation panel 2 is activated to select song data from among those stored in the RAM 12. This song selection process is carried out in the following step sequence.

Step 31: The initial setting data of the song data selected via the song selection switch 21A or 21B is read out to establish various initial conditions, such as initial tone color, tempo, volume, effect, etc. of the individual channels.

Step 32: The sequence data of the selected song data is read out, and a search is made for any of the channels where there is an event and a style-related event. That is, any channel number stored with note event and performance event data is read out, and a determination is made as to whether there is a style-related event such as a style/section, chord event or the like in the sequence data.

Step 33: On the basis of the search result obtained at preceding step 32, the LED is lit which is located adjacent to the sequencer channel switch 26 corresponding to the channel having an event.

Step 34: On the basis of the search result obtained at preceding step 32, a determination is made as to whether there is a style-related event. With an affirmative (YES) determination, the CPU 10 proceeds to step 35; otherwise, the CPU 10 branches to step 36.

Step 35: Now that preceding step 34 has determined that there is a style-related event, "1" is set to style-related event presence flag STEXT. The style-related event presence flag STEXT at a value of "1" indicates that there is a style-related event in the sequence data of the song data, whereas the flag STEXT at a value of "0" indicates that there is no such style-related event.

Step 36: Because of the determination at step 34 that there is no style-related event, "0" is set to the style-related event presence flag STEXT.

Step 37: First delta time data in the song data is stored into sequencer timing register TIME1 which counts time for sequentially reading out sequence data from the song data of FIG. 2A.

Step 38: "0" is set to accompaniment-on flag ACCMP, replace-on flag REPLC and style-conversion-on flag STCHG. The accompaniment-on flag ACCMP at a value of "1" indicates that an accompaniment is to be performed on the basis of the style data of FIG. 2B, whereas the accompaniment-on flag ACCMP at a value of "0" indicates that no such accompaniment is to be performed. The replace-on flag REPLC at "1" indicates that the sequencer channel corresponding to a replace event is to be placed in the mute or non-mute state, whereas the replace-on flag REPLC at "0" indicates that no such mute/non-mute control is to be made. Further, the style-conversion-on flag STCHG at value "1" indicates that a conversion process is to be performed on the basis of the style/section converting table, whereas the style-conversion-on flag STCHG at value "0" indicates that no such conversion is to be performed.

Step 39: The LEDs associated with the accompaniment switch 22, replace switch 23 and style conversion switch 24 on the operation panel 2 are turned off to inform the operator (player) that the musical instrument is in the accompaniment-OFF, replace-OFF and style-conversion-OFF states. After that, the CPU 10 returns to the main routine.

Figure 4:
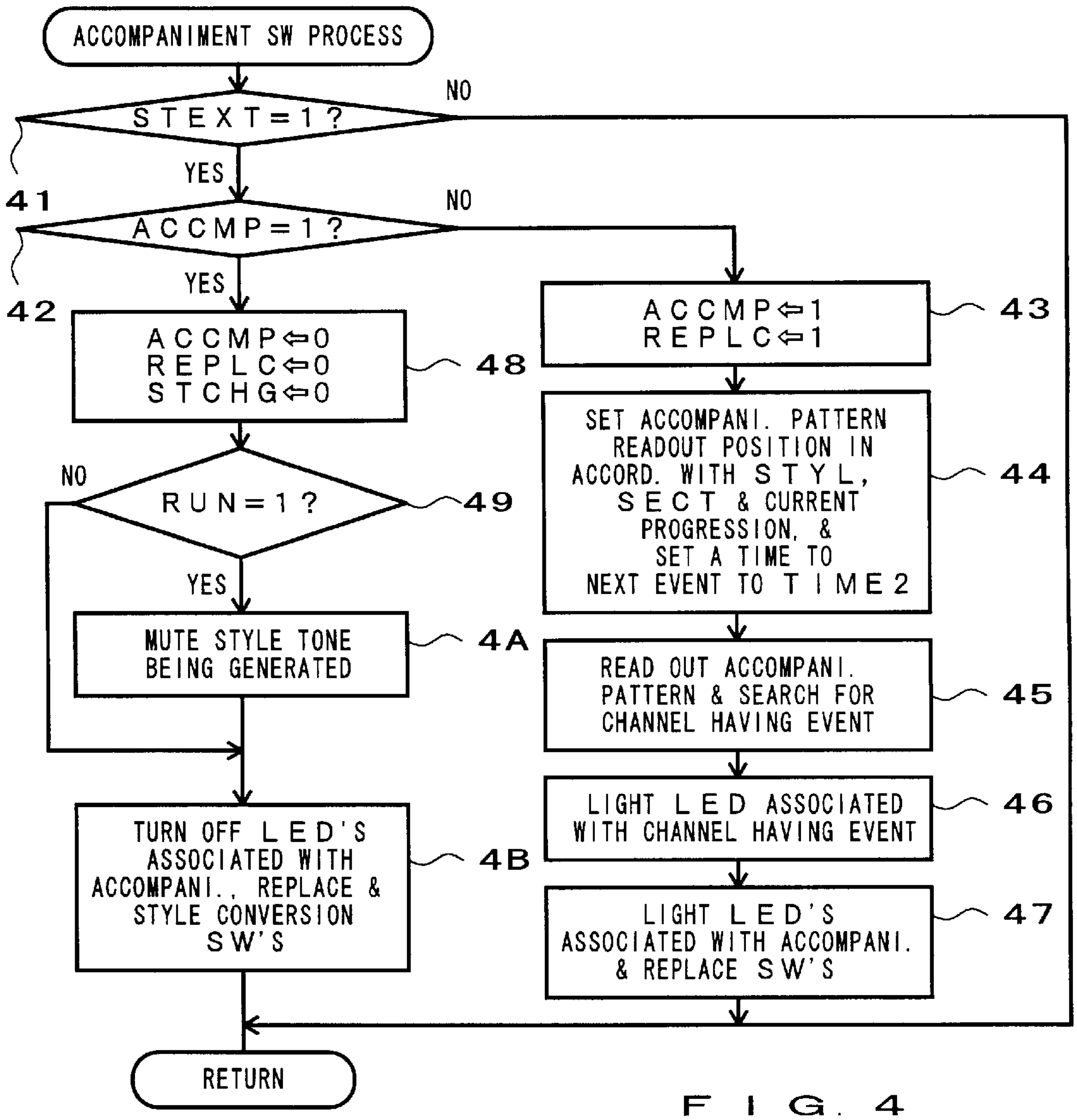
FIG. 4 is a flowchart illustrating an example of an accompaniment switch process performed by the CPU of FIG. 1 when an accompaniment switch is activated on the operation panel.

FIG. 4 is a flowchart illustrating an example of an accompaniment switch process performed by the CPU 10 of FIG. 1 when the accompaniment switch 22 is activated on the operation panel 2. This accompaniment switch process is carried out in the following step sequence.

Step 41: It is determined whether or not the style-related event presence flag STEXT is at "1". If answered in the affirmative, it means that there is a style-related event in the song data, and thus the CPU 10 proceeds to step 42. If answered in the negative, it means that there is no style-related event in the song data, and thus the CPU 10 immediately returns to the main routine.

Step 42: In order to determine whether an accompaniment is ON or OFF at the time of activation of the accompaniment switch 22, a determination is made as to whether the accompaniment-on flag ACCMP is at "1" or not. If the accompaniment-on flag ACCMP is at "1" (YES), the CPU 10 goes to step 48, but if not, the CPU 10 branches to step 43.

Step 43: Now that preceding step 42 has determined that the accompaniment-on flag ACCMP is at "0" (accompaniment OFF), the flag ACCMP and replace-on flag REPLC are set to "1" to indicate that the musical instrument will be in the accompaniment-ON and replace-ON states from that time on.

Step 44: A readout position for an accompaniment pattern of a predetermined section is selected from among the style data of FIG. 2B in accordance with the stored values in the style number register STYL and section number register SECT and the current performance position, and a time up to a next event (delta time) is set to style timing register TIME2. The style number register STYL and section number register SECT store a style number and a section number, respectively. The style timing register TIME2 which counts time for sequentially reading out accompaniment patterns from a predetermined section of the style data of FIG. 2B.

Step 45: All accompaniment patterns specified by the stored values in the style number register STYL and section number register SECT are read out, and a search is made for any channel where there is an event.

Step 46: On the basis of the search result obtained at preceding step 45, the LED is lit which is located adjacent to the accompaniment channel switch 27 corresponding to the channel having an event.

Step 47: The LEDs associated with the accompaniment switch 22 and replace switch 23 are lit to inform the operator (player) that the musical instrument is in the accompaniment-ON and replace-ON states. After that, the CPU 10 returns to the main routine. Step 48: Now that preceding step 42 has determined that the accompaniment-on flag ACCMP is at "1" (accompaniment ON), "0" is set to the accompaniment-on flag ACCMP, replace-on flag REPLC and style-conversion-on flag STCHG.

Step 49: It is determined whether running state flag RUN is at "1", i.e., whether an automatic performance is in progress. If answered in the affirmative (YES), the CPU 10 proceeds to step 4A, but if the flag RUN is at "0", the CPU 10 jumps to step 4B. The running state flag RUN at "1" indicates that an automatic performance is in progress, whereas the running state flag RUN at "0" indicates that an automatic performance is not in progress.

Step 4A: Because of the determination at step 49 that an automatic performance is in progress, a style-related accompaniment tone being currently generated is deadened or muted.

Step 4B: The LEDs associated with the accompaniment switch 22, replace switch 23 and style conversion switch 24 on the operation panel 2 are turned off to inform the operator (player) that the musical instrument is in the accompaniment-OFF, replace-OFF and style-conversion-OFF states. After that, the CPU 10 returns to the main routine.

Figure 5:
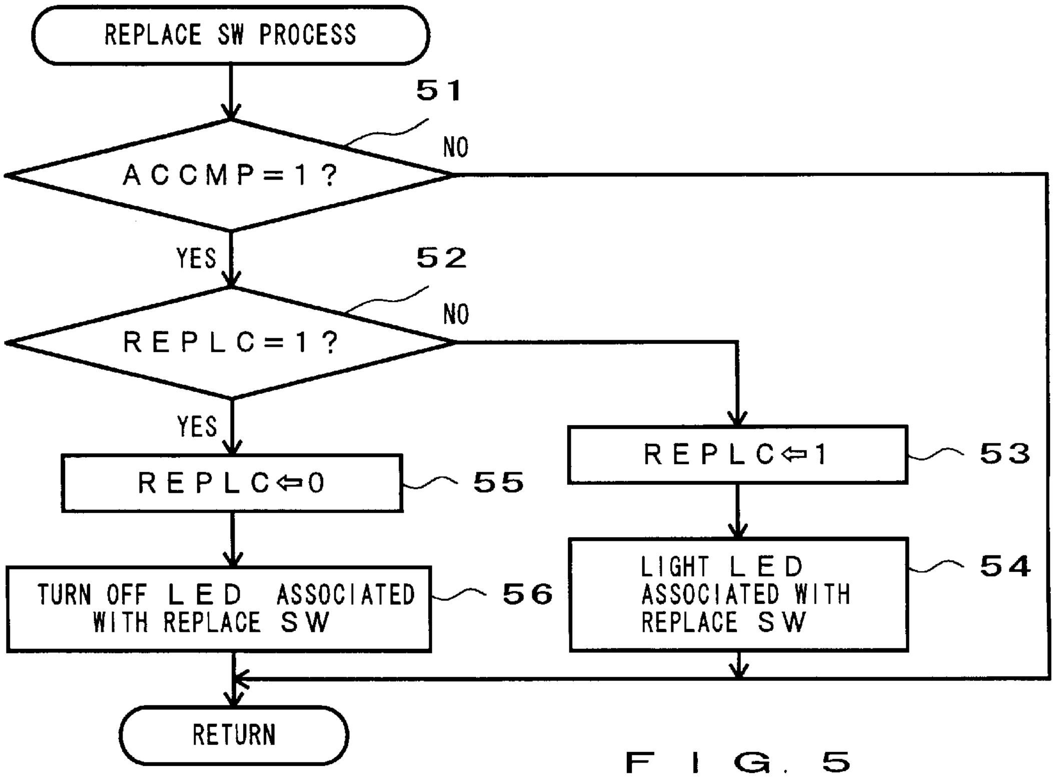
FIG. 5 is a flowchart illustrating an example of a replace switch process performed by the CPU of FIG. 1 when a replace switch is activated on the operation panel.

FIG. 5 illustrates an example of a replace switch process performed by the CPU of FIG. 1 when the replace switch 23 is activated on the operation panel 2. This replace switch process is carried out in the following step sequence.

Step 51: In order to determine whether an accompaniment is ON or OFF at the time of activation of the replace switch 23, a determination is made as to whether the accompaniment-on flag ACCMP is at "1" or not. If the accompaniment-on flag ACCMP is at "1" (YES), the CPU 10 goes to step 52, but if not, the CPU 10 ignores the activation of the replace switch 23 and returns to the main routine.

Step 52: Now that preceding step 51 has determined that the accompaniment-on flag ACCMP is at "1" (accompaniment ON), it is determined at this step whether the replace-on flag REPLC is at "1", in order to ascertain whether a replace operation is ON or OFF. If the replace-on flag REPLC is at "1" (YES), the CPU 10 proceeds to step 55; otherwise, the CPU 10 branches to step 53.

Step 53: Now that preceding step 52 has determined that the replace-on flag REPLC is at "0" (replace OFF), the flag REPLC is set to "1" at this step.

Step 54: The LED associated with the replace switch 23 is lit to inform the operator (player) that the musical instrument is now placed in the replace-ON state.

Step 55: Now that preceding step 52 has determined that the replace-on flag REPLC is at "1" (replace ON), the flag REPLC is set to "0" at this step.

Step 56: The LED associated with the replace switch 23 is turned off to inform the operator (player) that the musical instrument is now placed in the replace-OFF state.

Figure 6:
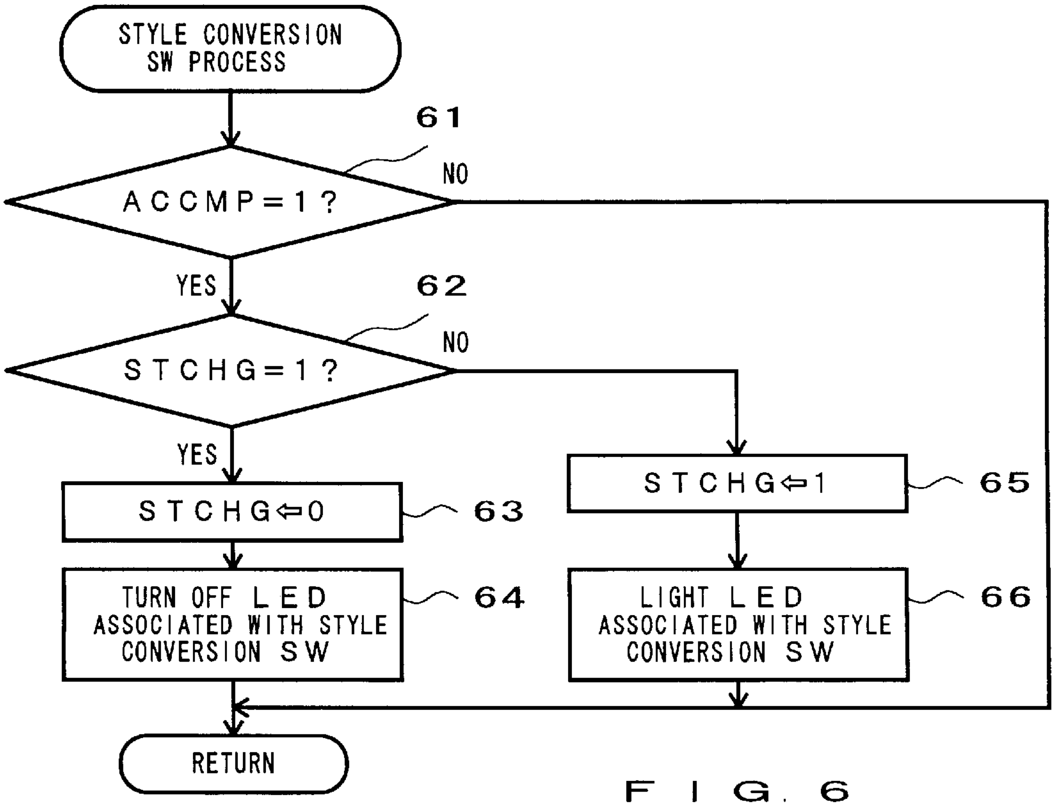
FIG. 6 is a flowchart illustrating an example of a style conversion switch process performed by the CPU of FIG. 1 when a style conversion switch is activated on the operation panel.

FIG. 6 illustrates an example of a style conversion switch process performed by the CPU of FIG. 1 when the style conversion switch 24 is activated on the operation panel 2. This style conversion switch process is carried out in the following step sequence.

Step 61: In order to determine whether an accompaniment is ON or OFF at the time of activation of the style conversion switch 24, a determination is made as to whether the accompaniment-on flag ACCMP is at "1" or not. If the accompaniment-on flag ACCMP is at "1" (YES), the CPU 10 goes to step 62, but if not, the CPU 10 ignores the activation of the style conversion switch 24 and returns to the main routine.

Step 62: Now that preceding step 61 has determined that the accompaniment-on flag ACCMP is at "1" (accompaniment ON), it is determined at this step whether the style-conversion-on flag STCHG is at "1", in order to ascertain whether a style conversion is ON or OFF. If the flag STCHG is at "1" (YES), the CPU 10 proceeds to step 65; otherwise, the CPU 10 goes to step 63.

Step 63: Now that preceding step 62 has determined that the style-conversion-on flag STCHG is at "0" (style conversion OFF), the flag STCHG is set to "1" at this step.

Step 64: The LED associated with the style conversion switch 24 is lit to inform the operator (player) that the musical instrument is now placed in the style-conversion-ON state.

Step 65: Now that preceding step 62 has determined that the style-conversion-on flag STCHG is at "1" (style-conversion ON), the flag STCHG is set to "0" at this step.

Step 66: The LED associated with the style conversion switch 24 is turned off to inform the operator (player) that the musical instrument is now placed in the style-conversion-OFF state.

Figure 7:
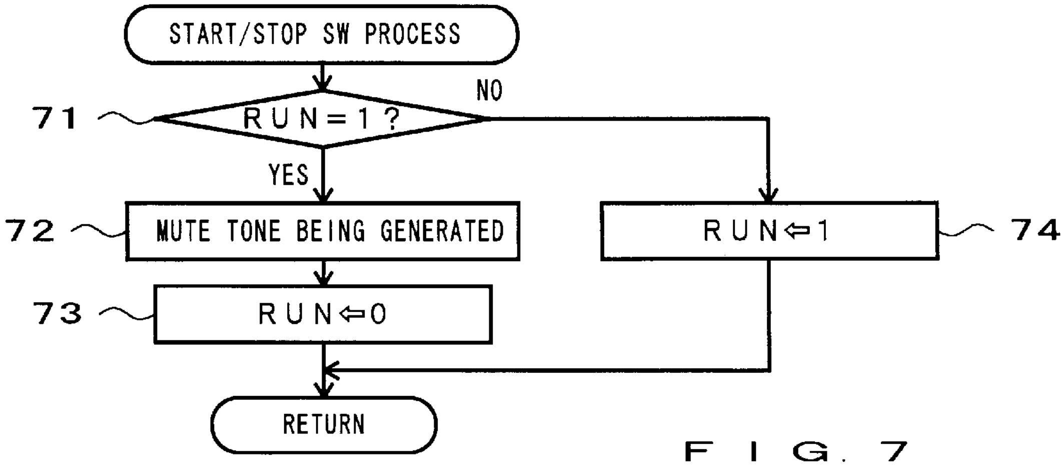
FIG. 7 is a flowchart illustrating an example of a start/stop switch process performed by the CPU of FIG. 1 when a start/stop switch is activated on the operation panel.

FIG. 7 illustrates an example of a start/stop switch process performed by the CPU 10 of FIG. 1 when the start/stop switch 25 is activated on the operation panel 2. This start/stop switch process is carried out in the following step sequence.

Step 71: It is determined whether the running state flag RUN is at "1". If answered in the affirmative (YES), the CPU 10 proceeds to step 72, but if the flag RUN is at "0", the CPU 10 branches to step 74.

Step 72: Since the determination at preceding step 71 that an automatic performance is in progress means that the start/stop switch 25 has been activated during the automatic performance, a note-off signal is supplied to the tone source circuit 16 to mute a tone being sounded to thereby stop the automatic performance.

Step 73: "0" is set to the running state flag RUN.

Step 74: Since the determination at preceding step 71 that an automatic performance is not in progress means that the start/stop switch 25 has been activated when an automatic performance is not in progress, "1" is set to the flag RUN to initiate an automatic performance.

Figure 8:
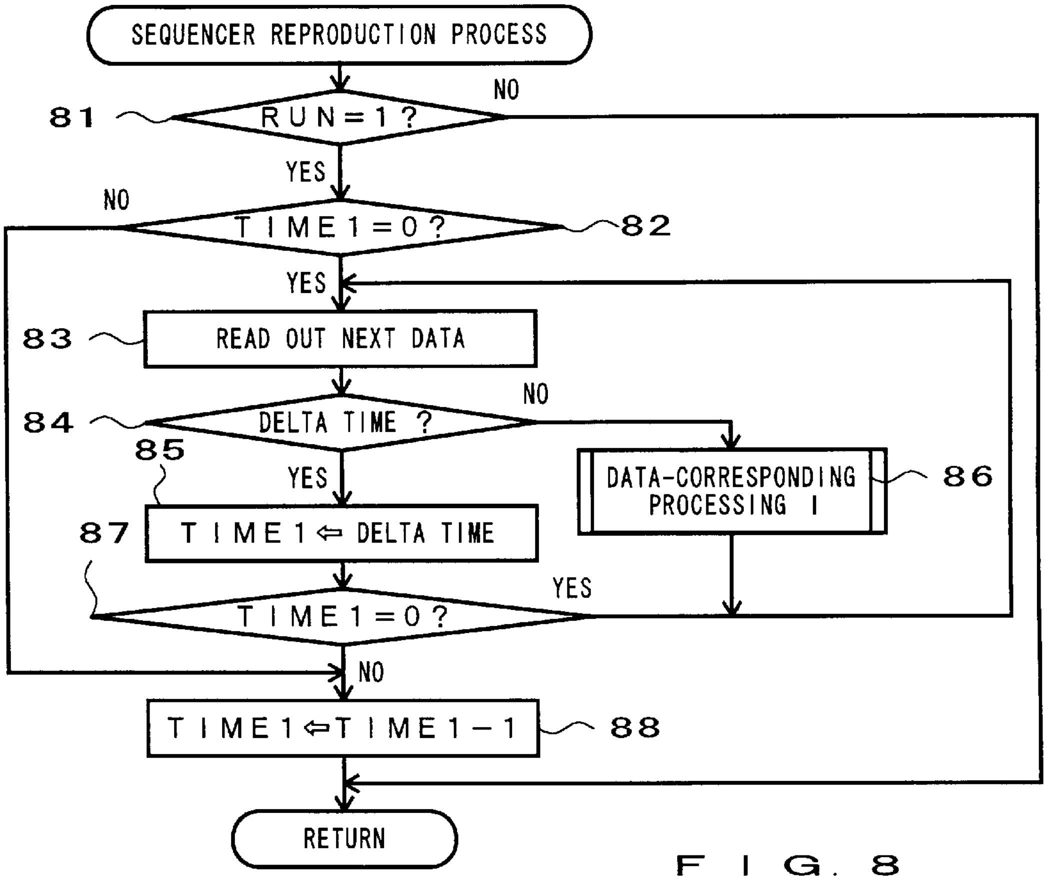
FIG. 8 is a sequencer reproduction process which is executed as a timer interrupt process at a frequency of 96times per quarter note.

FIG. 8 is a sequencer reproduction process which is executed as a timer interrupt process at a frequency of 96 times per quarter note. This sequencer reproduction process is carried out in the following step sequence.

Step 81: It is determined whether the running state flag RUN is at "1". If answered in the affirmative (YES), the CPU 10 proceeds to step 82, but if the flag RUN is at "0", the CPU 10 returns to the main routine to wait until next interrupt timing. Namely, operations at and after step 82 will not be executed until "1" is set to the running state flag RUN at step 74 of FIG. 7.

Step 82: A determination is made as to whether the stored value in the sequencer timing register TIME1 is "0" or not. If answered in the affirmative, it means that predetermined time for reading out sequence data from among the song data of FIG. 2A has been reached, so that the CPU 10 proceeds to step 83. If, however, the stored value in the sequencer timing register TIME1 is not "0", the CPU 10 jumps to step 88.

Step 83: Because the predetermined time for reading out sequence data has been reached as determined at preceding step 82, next data is read out from among the song data of FIG. 2A.

Step 84: It is determined whether or not the data read out at preceding step 83 is delta time data. If answered in the affirmative, the CPU 10 proceeds to step 85; otherwise, the CPU 10 branches to step 86.

Step 85: Because the read-out data is delta time data as determined at step 84, the delta time data is stored into the sequencer timing register TIME1.

Step 86: Because the read-out data is not delta time data as determined at step 84, processing corresponding to the read-out data (data-corresponding processing I) is performed as will be described in detail below.

Step 87: A determination is made whether the stored value in the sequencer timing register TIME1 is "0" or not, i.e., whether or not the delta time data read out at step 83 is "0". If answered in the affirmative, the CPU 10 loops back to step 83 to read out event data corresponding to the delta time and then performs the data-corresponding processing I. If the stored value in the sequencer timing register TIME1 is not "0" (NO), the CPU 10 goes to step 88.

Step 88: Because step 82 or 87 has determined that the stored value in the sequencer timing register TIME1 is not "0", the stored value in the register TIME1 is decremented by 1, and then the CPU 10 returns to the main routine to wait for next interrupt timing.

Figure 9A:
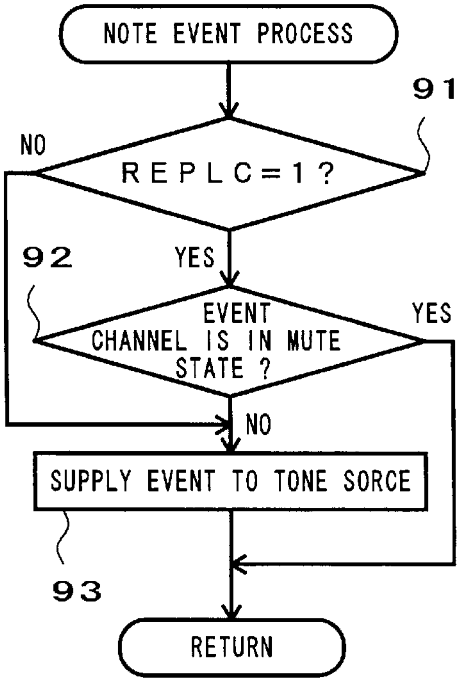
FIGS. 9A and 9B are flowcharts each illustrating the detail of data-corresponding processing I performed at step 86 of FIG. 8 when data read out at step 83 of FIG. 8 is note event data or style/section number event data.
Figure 9B:
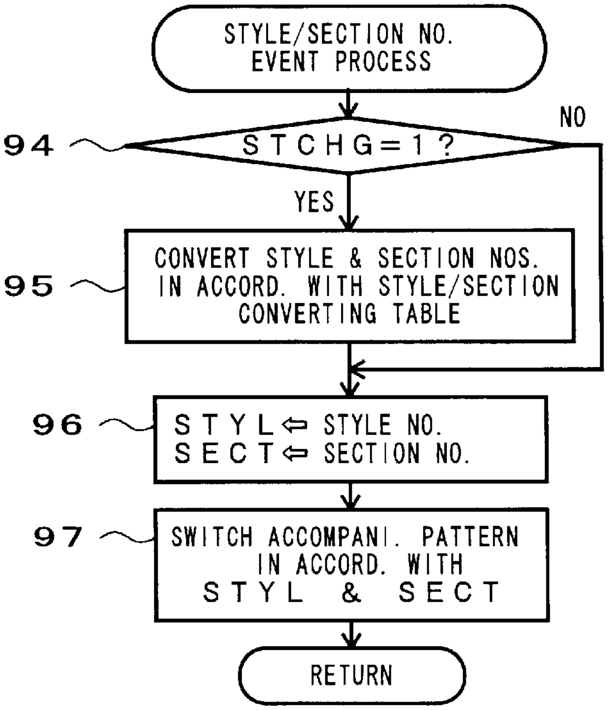

FIGS. 9A and 9B are flowcharts each illustrating the detail of the data-corresponding processing I of step 86 when the data read out at step 83 of FIG. 8 is note event data or style/section number event data.

FIG. 9A is a flowchart illustrating a note-event process performed as the data-corresponding processing I when the data read out at step 83 of FIG. 8 is note event data. This note-event process is carried out in the following step sequence.

Step 91: Because the data read out at step 83 of FIG. 8 is note event data, it is determined whether the replace-on flag REPLC is at "1". With an affirmative answer, the CPU 10 proceeds to step 92 to execute a replace process; otherwise, the CPU 10 jumps to step 93 without executing the replace process.

Step 92: Because the replace-on flag REPLC is at "1" as determined at preceding step 91, it is further determined whether the channel corresponding to the event is in the mute state. If answered in the affirmative, it means that the event is to be only replaced or muted by an accompaniment tone, so that the CPU 10 immediately returns to step 83. If answered in the negative, the CPU 10 goes to next step 93 since the event is not to be replaced.

Step 93: Since steps 91 and 92 have determined that the note event is not to be replaced or muted, performance data corresponding to the note event is supplied to the tone source circuit 16, and then the CPU 10 reverts to step 83.

FIG. 9B is a flowchart illustrating a style/section number event process performed as the data-corresponding processing I when the data read out at step 83 of FIG. 8 is style/section number event data. This style/section number event process is carried out in the following step sequence.

Step 94: Because the data read out at step 83 of FIG. 8 is style/section number event data, it is determined whether the style-conversion-on flag STCHG is at "1". With an affirmative answer, the CPU 10 proceeds to step 95 to execute a conversion process based on the style/section converting table; otherwise, the CPU 10 jumps to step 96.

Step 95: Because the style-conversion-on flag STCHG is at "1" as determined at preceding step 94, the style number and section number are converted into new (converted) style and section numbers in accordance with the style/section converting table.

Step 96: The style and section numbers read out at step 83 of FIG. 8 or new style and section numbers converted at preceding step 96 are stored into the style number register STYL and section number register SECT, respectively.

Step 97: Accompaniment pattern to be reproduced is switched in accordance with the stored values in the style number register STYL and section number register SECT. Namely, the accompaniment pattern is switched to that of the style data of FIG. 2B specified by the respective stored values in the style number register STYL and section number register SECT, and then the CPU 10 reverts to step 83 of FIG. 8.

FIGS. 10A to 10E are flowcharts each illustrating the detail of the data-corresponding processing I performed at step 86 of FIG. 8 when the data read out at step 83 of FIG. 8 is replace event data, style mute event data, other performance event data, chord event data or end event data.

Figure 10A:
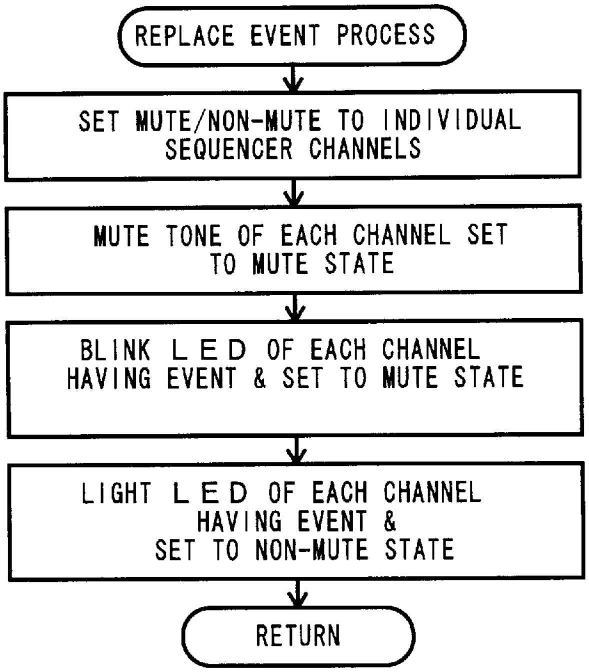
FIGS. 10A to 10E are flowcharts each illustrating the detail of the data-corresponding processing I performed at step 86 of FIG. 8 when data read out at step 83 of FIG. 8 is replace event data or style mute event data, other performance event data, chord event data or end event data.

FIG. 10A illustrates a replace event process performed as the data-corresponding processing I when the read-out data is replace event data. This replace event process is carried out in the following step sequence.

First, on the basis of the read-out 16-bit replace event data, the individual sequencer channels are set to mute or non-mute state. The tone of each of the sequencer channels set as a mute channel is muted.

The LED associated with the switch 26 corresponding to each sequencer channel which has an event and is set to the mute state is caused to blink. Also, the LED associated with the switch 26 corresponding to each sequencer channel which has an event and is set to the non-mute state is lit, and then the CPU 10 reverts to step 83 of FIG. 8. Thus, the operator can readily distinguish between the sequencer channels which have an event but are in the mute state and other sequencer channels which are in the non-mute state.

Figure 10B:
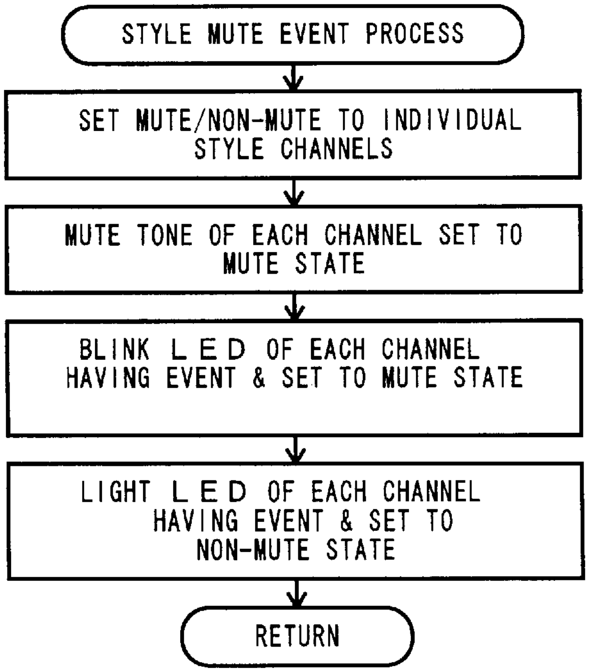

FIG. 10B illustrates a style mute event process performed as the data-corresponding processing I when the read-out data is style mute event data. This style mute event process is carried out in the following step sequence.

First, on the basis of the read-out 16-bit style mute event data, the individual accompaniment channels are set to the mute or non-mute state. The tone of each of the accompaniment channels set to the mute state is muted.

The LED associated with the switch 27 corresponding to each accompaniment channel which has an event and is set to the mute state is caused to blink. Also, the LED associated with the switch 27 corresponding to each accompaniment channel which has an event and is set to the non-mute state is lit, and then the CPU 10 reverts to step 83 of FIG. 8. Thus, the operator can readily distinguish between the accompaniment channels which have an event but are in the mute state and other accompaniment channels which are in the non-mute state.

Figure 10C:
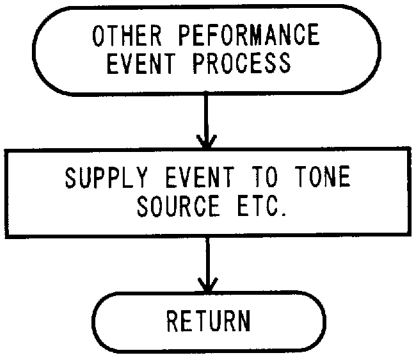

FIG. 10C illustrates an other performance event process executed as the data-corresponding processing I when the read-out data is other performance event data. In this other performance event process, the read-out performance event data is supplied to the tone source circuit 16, and then the CPU 10 reverts to step 83 of FIG. 8.

Figure 10D:
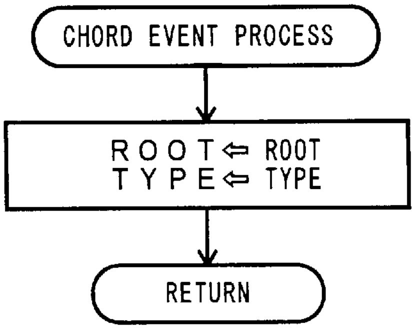

FIG. 10D illustrates a chord event process executed as the data-corresponding processing I when the read-out data is chord event data. In this chord event process, the readout root data and type data are stored into root register ROOT and type register TYPE, and then the CPU 10 reverts to step 83 of FIG. 8.

Figure 10E:
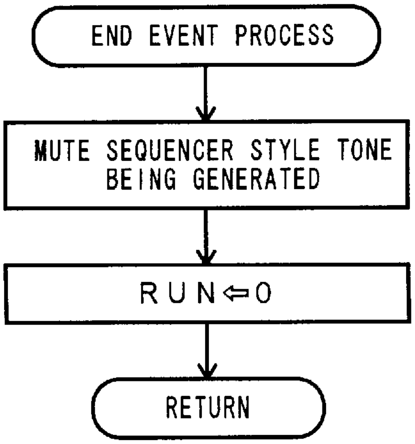

FIG. 10E illustrates an end event process executed as the data-corresponding processing I when the read-out data is end event data. In this end event process, all tones being generated in relation to the sequencer and style are muted in response to the read-out end event data, and the CPU 10 reverts to step 83 of FIG. 8 after having reset the running state flag RUN to "0".

Figure 11:
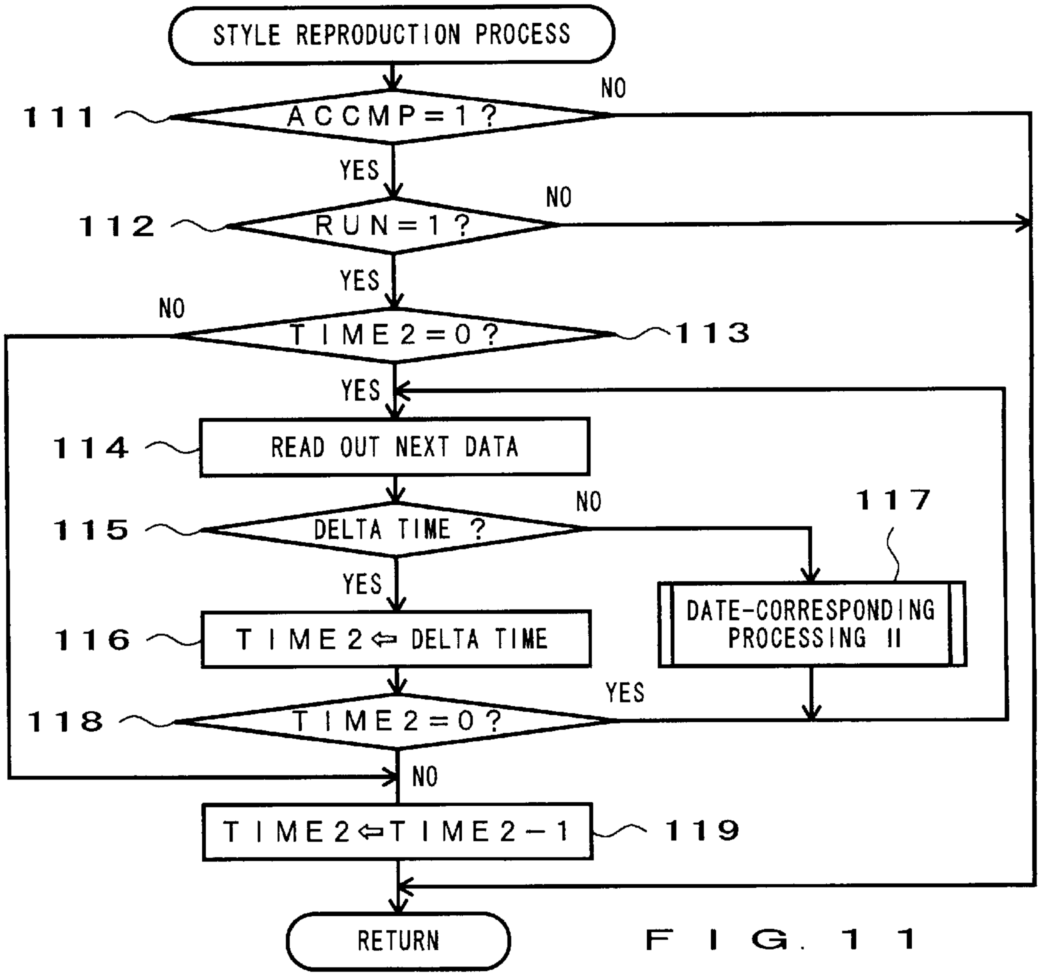
FIG. 11 is a flowchart illustrating an example of a style reproduction process which is executed as a timer interrupt process at a frequency of 96 times per quarter note.

FIG. 11 illustrates an example of a style reproduction process which is executed in the following step sequence as a timer interrupt process at a frequency of 96 times per quarter note.

Step 111: A determination is made as to whether the musical instrument at the current interrupt timing is in the accompaniment-ON or accompaniment-OFF state, i.e., whether the accompaniment-on flag ACCMP is at "1" or not at the current interrupt timing. If the flag ACCMP is at "1", the CPU 10 proceeds to step 112 to execute an accompaniment, but if not, the CPU 10 returns to the main routine without executing an accompaniment and waits until next interrupt timing. Thus, operations at and after step 112 will not be performed until the accompaniment-on flag ACCMP is set to "1" at step 43 of FIG. 4.

Step 112: A determination is made as to whether the running state flag RUN is at "1" or not. If the flag RUN is at "1", the CPU 10 proceeds to step 113, but if not, the CPU 10 returns to the main routine to wait until next interrupt timing. Thus, operations at and after step 113 will not be performed until the running state flag RUN is set to "1" at step 74 of FIG. 7.

Step 113: A determination is made as to whether the stored value in the style timing register TIME2 is "0" or not. If answered in the affirmative, it means that predetermined time for reading out accompaniment data from among the style data of FIG. 2B has been reached, so that the CPU 10 proceeds to next step 114. If, however, the stored value in the style timing register TIME2 is not "0", the CPU 10 jumps to step 119.

Step 114: Because the predetermined time for reading out style data has been reached as determined at preceding step 113, next data is read out from among the style data of FIG. 2B.

Step 115: It is determined whether or not the data read out at preceding step 114 is delta time data. If answered in the affirmative, the CPU 10 proceeds to step 116; otherwise, the CPU 10 branches to step 117.

Step 116: Because the read-out data is delta time data as determined at step 115, the delta time data is stored into the style timing register TIME2.

Step 117: Because the read-out data is not delta time data as determined at step 115, processing corresponding to the read-out data (data-corresponding processing II)is performed as will be described in detail below.

Step 118: A determination is made whether the stored value in the style timing register TIME2 is "0" or not, i.e., where or not the delta time data read out at step 114 is "0". If answered in the affirmative, the CPU 10 loops back to step 114 to read out event data corresponding to the delta time and then performs the data-corresponding processing II. If the stored value in the style timing register TIME2 is not "0" (NO), the CPU 10 goes to step 119.

Step 119: Because step 113 or 118 has determined that the stored value in the style timing register TIME2 is not "0", the stored value in the register TIME2 is decremented by 1, and then the CPU 10 returns to the main routine to wait until next interrupt timing.

Figure 12A:
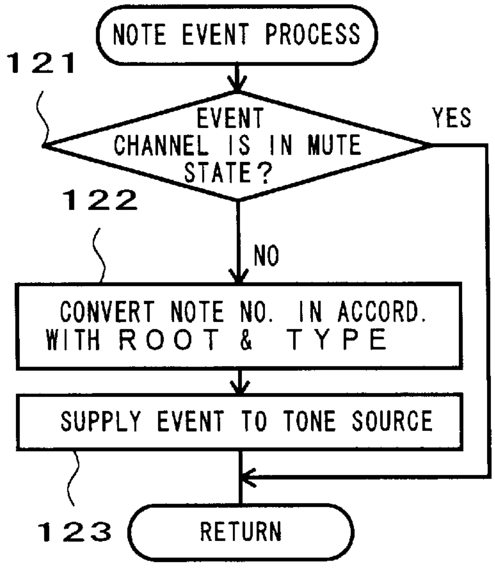
FIGS. 12A to 12C are flowcharts each illustrating the detail of data-corresponding processing II performed at step 117 of FIG. 11 when data read out at step 114 of FIG. 11 is note event data, other performance event data or end event data.
Figure 12B:
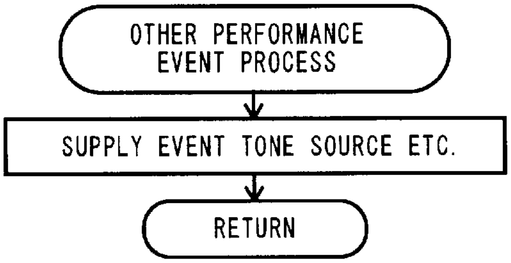
Figure 12C:
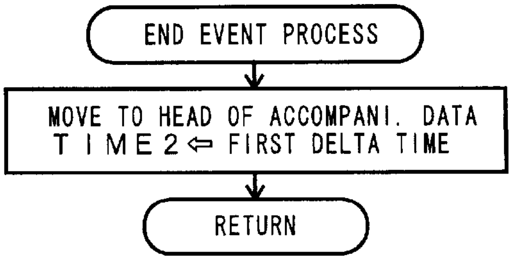

FIGS. 12A to 12C are flowcharts each illustrating the detail of the data-corresponding processing II of step 117 when the data read out at step 114 of FIG. 11 is note event data, other performance event data or end event data.

FIG. 12A is a flowchart illustrating a note-event process performed as the data-corresponding processing II when the read-out data is note event data. This note-event process is carried out in the following step sequence.

Step 121: It is determined whether the channel corresponding to the event is in the mute state. If answered in the affirmative, it means that no performance relating to the event is not to be executed, so that the CPU 10 immediately returns to the main routine. If answered in the negative, the CPU 10 goes to next step 122 in order to execute performance relating to the event.

Step 122: The note number of the read-out note event is converted to a note number based on the root data in the root register ROOT and the type data in the type register TYPE. However, no such conversion is made for the rhythm part.

Step 123: Performance data corresponding to the note event converted at preceding step 122 is supplied to the tone source circuit 16, and then the CPU 10 reverts to step 114 of FIG. 11.

FIG. 12B illustrates an other performance event process executed as the data-corresponding processing II when the read-out data is other performance event data. In this other performance event process, the read-out performance event data is supplied to the tone source circuit 16, and then the CPU 10 reverts to step 114 of FIG. 11.

FIG. 12C illustrates an end event process executed as the data-corresponding processing II when the read-out data is end event data. In this end event process, the CPU 10 moves to the head of the corresponding accompaniment data since the read-out data is end event data, and reverts to step 114 of FIG. 11 after storing the first delta time data into the style timing register TIME2.

Figure 13:
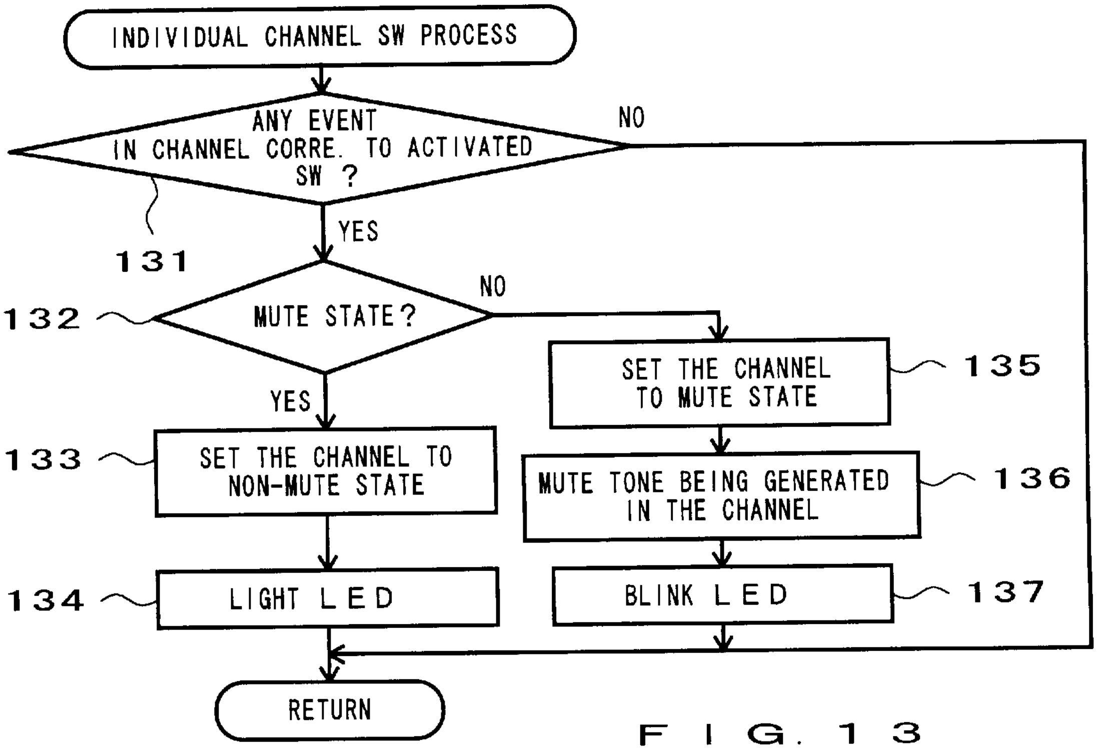
FIG. 13 is a flowchart illustrating an example of a channel switch process performed by the CPU of FIG. 1 when any one of sequencer channel switches or accompaniment channel switches is activated on the operation panel.

Although the embodiment has been described so far in connection with the case where the mute/non-mute states are set on the basis of the replace event data or style mute event data contained in the song data, such mute/non-mute states can be set individually by activating the sequencer channel switches 26 or accompaniment channel switches 27 independently. That is, the LEDs associated with the sequencer and accompaniment channel switches 26 and 27 corresponding each channel having an event are kept lit, and of those, the LED corresponding to each channel in the mute state is caused to blink. Thus, an individual channel switch process of FIG. 13 is performed by individually activating the channel switches associated with the LEDs being lit and blinking, so that the operator is allowed to set the mute/non-mute states as desired. The individual channel switch process will be described in detail hereinbelow.

FIG. 13 is a flowchart illustrating an example of the individual channel switch process performed by the CPU of FIG. 1 when any of the sequencer channel switches 26 or accompaniment channel switches 27 is activated on the operation panel 2. This individual channel switch process is carried out in the following step sequence.

Step 131: It is determined whether or not there is any event in the channel corresponding to the activated switch. If answered in the affirmative, the CPU proceeds to 132, but if not, the CPU 10 returns to the main routine.

Step 132: Now that preceding step 131 has determined that there is an event, it is further determined whether the corresponding channel is currently in the mute or non-mute state. If the corresponding channel is in the mute state (YES), the CPU 10 proceeds to step 133, but if the corresponding channel is in the non-mute state (NO), the CPU 10 branches to step 135.

Step 133: Now that the corresponding channel is currently in the mute state as determined at preceding step 132, the channel is set to the non-mute state.

Step 134: The LEDs associated with the corresponding channel switches 26 and 27 are lit to inform that the channel is now placed in the non-mute state.

Step 135: Now that the corresponding channel is currently in the non-mute state as determined at preceding step 132, the channel is set to the mute state.

Step 136: Tone being generated in the accompaniment channel set to the mute state at preceding step 135 is muted.

Step 137: The LEDs associated with the corresponding channel switches 26 and 27 are caused to blink to inform that the channel is now placed in the mute state.

Although the embodiment has been described so far in connection with the case where the sequencer mute/non-mute states are set on the basis of the replace event data contained in the song data and the sequencer mute/non-mute states are set on the basis of the style mute event data contained in the song data, such sequencer mute/non-mute states may be set by relating the replace event process to the style mute event process. That is, when a sequencer channel is set to the mute state, a style channel corresponding to the channel may be set to the non-mute state; conversely, when a sequencer channel is set to the non-mute state, a style channel corresponding to the channel may be set to the mute state. Another embodiment of the replace event process corresponding to such a modification will be described below. The corresponding channels may be determined on the basis of respective tone colors set for the sequencer and style or by the user, or may be predetermined for each song.

Figure 14:
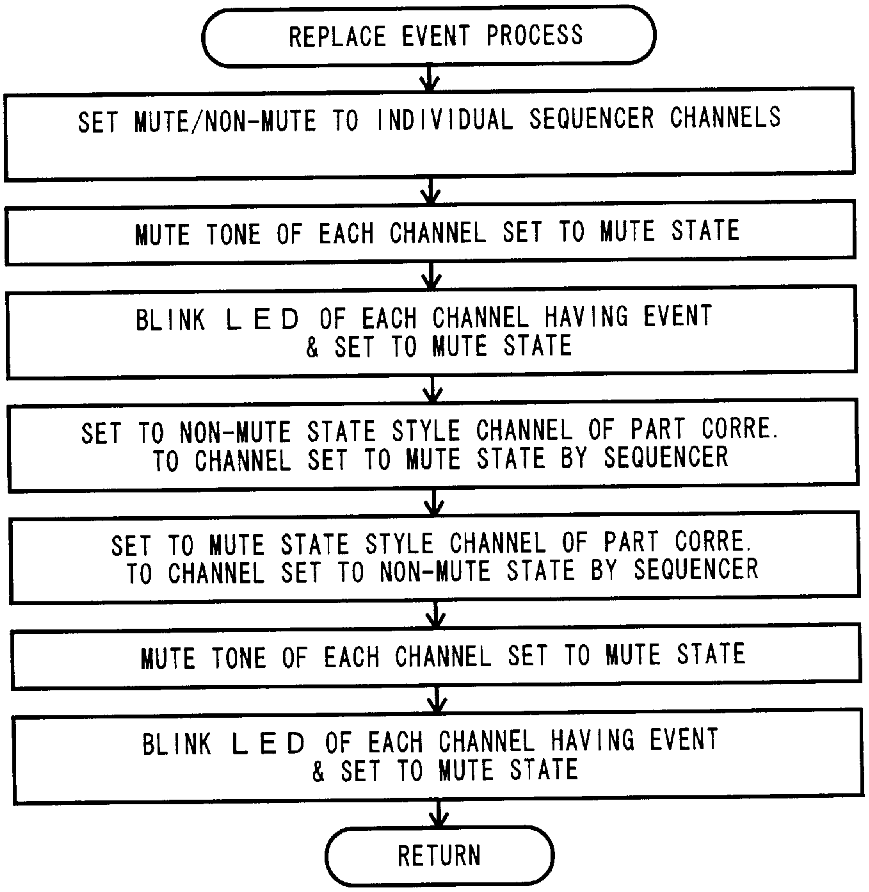
FIG. 14 is a flowchart illustrating another example of the replace event process of FIG. 10.

FIG. 14 is a flowchart illustrating the other example of the replace event process of FIG. 10, which is carried out in the following step sequence.

On the basis of the read-out 16-bit replace event data, the individual sequencer channels are set to the mute or non-mute states. Tone being generated in each of the sequencer channels set to the mute state at the preceding step is muted.

The LED associated with the switch 26 corresponding to each sequencer channel which has an event and is set to the mute state is caused to blink.

The style-related accompaniment channel of the part corresponding to the channel set to the non-mute state by the sequencer's operation is set to the mute state.

Tone being generated in the accompaniment channel set to the mute state is muted.

The LED associated with the accompaniment channel switch 27 corresponding to each sequencer channel which has an event and is set to the mute state is caused to blink.

Figure 15:
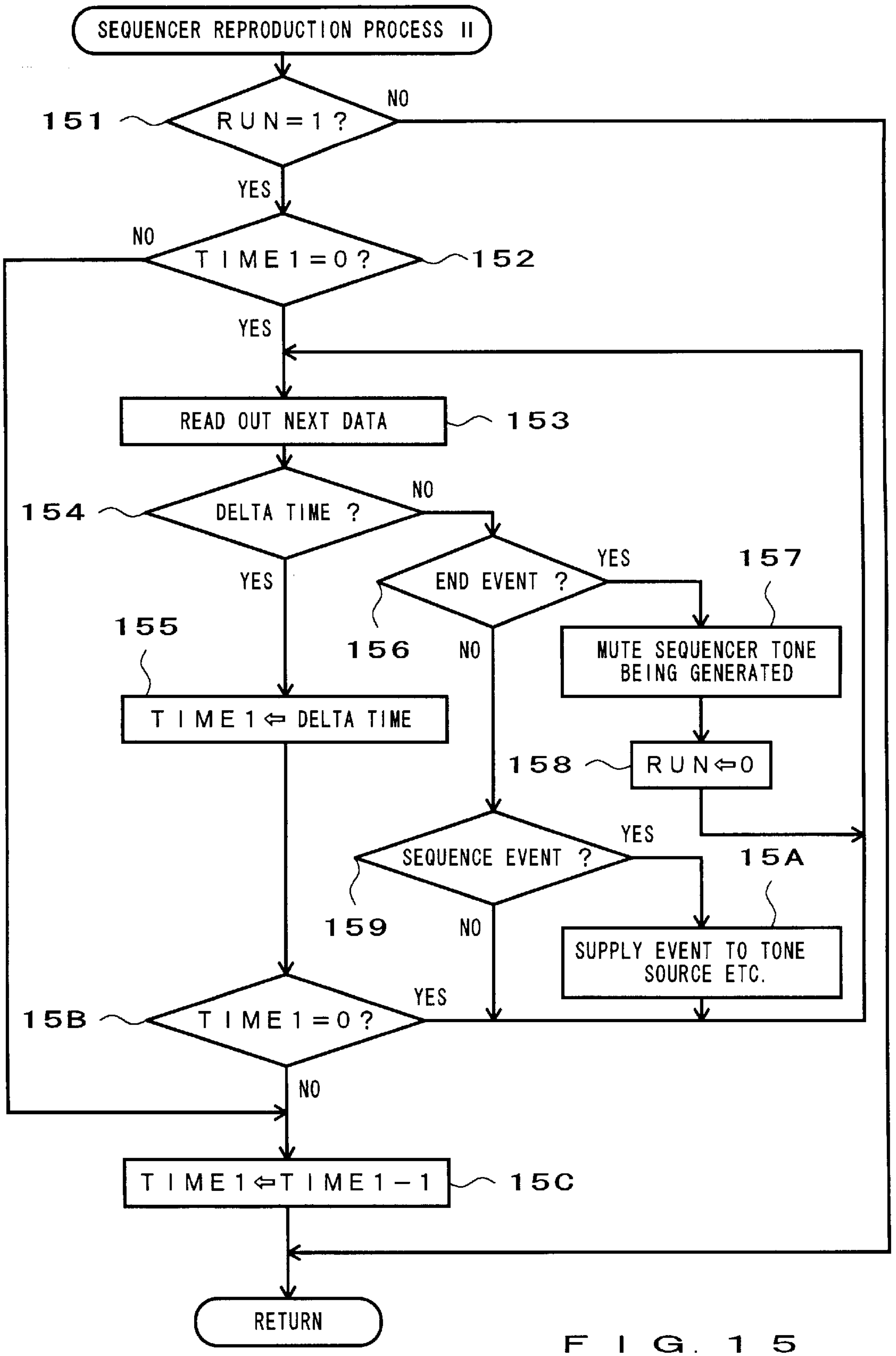
FIG. 15 is a flowchart illustrating a sequencer reproduction process II performed where the automatic performance device is of the sequencer type having no automatic accompaniment function.

While the embodiment has been described in connection with the case where the automatic performance device has an automatic accompaniment function, a description will be made hereinbelow about another embodiment where the automatic performance device has no automatic accompaniment function. FIG. 15 is a flowchart illustrating a sequencer reproduction process II performed where the automatic performance device is of the sequencer type having no automatic accompaniment function. Similarly to the sequencer reproduction process of FIG. 8, this sequencer reproduction process II is performed as a timer interrupt process at a frequency of 96 times per quarter note. This sequencer reproduction process II is different from the sequencer reproduction process of FIG. 8 in that only when the read-out data is sequence event data (note event data or other performance event data) or end event data, processing corresponding to such read-out data is performed, but no processing is performed when the readout data is other than the above-mentioned, such as style/section event data, chord event data, replace event data or style mute event data. The sequencer reproduction process II is carried out in the following step sequence.

Step 151: It is determined whether the running state flag RUN is at "1". If answered in the affirmative (YES), the CPU 10 proceeds to step 152, but if the flag RUN is at "0", the CPU 10 returns to the main routine to wait until next interrupt timing. Namely, operations at and after step 152 will not be executed until "1" is set to the running state flag RUN at step 74 of FIG. 7.

Step 152: A determination is made as to whether the stored value in the sequencer timing register TIME1 is "0" or not. If answered in the affirmative, it means that predetermined time for reading out sequence data from among the song data of FIG. 2A has been reached, so that the CPU 10 proceeds to next step 153. If, however, the stored value in the sequencer timing register TIME1 is not "0", the CPU 10 goes to step 158.

Step 153: Because the predetermined time for reading out sequence data has been reached as determined at preceding step 152, next data is read out from among the song data of FIG. 2A.

Step 154: It is determined whether or not the data read out at preceding step 153 is delta time data. If answered in the affirmative, the CPU 10 proceeds to step 155; otherwise, the CPU 10 branches to step 156.

Step 155: Because the read-out data is delta time data as determined at preceding step 154, the delta time data is stored into the sequencer timing register TIME1.

Step 156: Because the read-out data is not delta time data as determined at step 154, it is further determined whether the read-out data is end event data. If it is end event data (YES), the CPU 10 proceeds to step 157, but if not, the CPU 10 goes to step 159.

Step 157: Now that preceding step 156 has determined that the read-out data is end event data, sequencer-related tone being generated is muted.

Step 158: The running state flag RUN is reset to "0", and the CPU 10 reverts to step 153.

Step 159: Now that the read-out data is other than end event data as determined at step 156, a further determination is made as to whether the read-out data is sequence event data (note event data or other performance event data). If it is sequence event data (YES), the CPU 10 proceeds to step 15A, but if it is other than sequence event data (i.e., style/section event data, chord event data, replace event data or style mute event data), the CPU 10 reverts to step 153.

Step 15A: Because the read-out data is sequence event data as determined at preceding step 159, the event data is supplied to the tone source circuit 16, and the CPU 10 reverts to step 153.

Step 15B: A determination is made whether the stored value in the sequencer timing register TIME1 is "0" or not, i.e., whether or not the delta time data read out at step 153 is "0". If answered in the affirmative, the CPU 10 loops back to step 153 to read out event data corresponding to the delta time and then performs the operations of steps 156 to 15A. If the stored value in the sequencer timing register TIME1 is not "0" (NO), the CPU 10 goes to step 15C.

Step 15C: Because step 152 or 15C has determined that the stored value in the sequencer timing register TIME1 is not "0", the stored value in the register TIME1 is decremented by 1, and then the CPU 10 returns to the main routine to wait until next interrupt timing.

As mentioned, in the case where the automatic performance device has no automatic accompaniment function, sequence performance is executed by the sequence reproduction process II on the basis of the sequence data contained in the RAM 12, while in the case where the automatic performance device has an automatic accompaniment function, both sequence performance and accompaniment performance are executed by the sequence reproduction process and style reproduction process. In other words, using the song data stored in the RAM 12 in the above-mentioned manner, sequence performance can be executed irrespective of whether the automatic performance device has an automatic accompaniment function or not, and arrangement of the sequence performance is facilitated in the case where the automatic performance device has an automatic accompaniment function.

Although the mute or non-mute state is set for each sequencer channel in the above-mentioned embodiments, it may be set separately for each performance part. For example, where a plurality of channels are combined to form a single performance part and such a part is set to be muted, all of the corresponding channels may be muted.

Further, while in the above-mentioned embodiments, mute-related data (replace event data) is inserted in the sequencer performance information to allow the to-be-muted channel to be changed in accordance with the predetermined progression of a music piece, the same mute setting may be maintained throughout a music piece; that is, mute-related information may be provided as the initializing information. Alternatively, information indicating only whether or not to mute may be inserted in the sequencer performance data, and each channel to be muted may be set separately by the initial setting information or by the operator operating the automatic performance device.

Further, a performance part of the sequencer that is the same as an automatic performance part to be played may be automatically muted.

Although the embodiments have been described as providing the style/section converting table for each song, such table information may be provided independently of the song. For instance, the style/section converting tables may be provided in RAM of the automatic performance device.

Furthermore, although the embodiments have been described in connection with the case where the style data is stored in the automatic performance device, a portion of the style data (data of style peculiar to song) may be contained in the song data. With this arrangement, it is sufficient that only fundamental style data be stored in the automatic performance device, and this effectively saves a memory capacity.

In addition, while the above embodiments have been described in connection with an electronic musical instrument containing an automatic accompaniment performance device, the present invention may of course be applied to a system where a sequencer module for executing an automatic performance and a tone source module having a tone source circuit are provided separately and data are exchanged between the two modules by way of well-known MIDI standards.

Moreover, although the embodiments have been described in connection with the case where the present invention is applied to automatic performance, the present invention may also be applied to automatic rhythm or accompaniment performance.

The present arranged in the above-mentioned manner achieves the superior benefit that it can easily vary the arrangement of a music piece with no need for editing performance data.

What is claimed is:

1. An automatic performance device comprising:

storage means for storing first automatic performance data for a plurality of simultaneously-performed performance parts that includes at least one melody part and one or more accompaniment parts, and second automatic performance data for at least one accompaniment part, said first and second automatic performance data including performance event information;

first performance means for reading out said first automatic performance data from said storage means in order of event occurrence, to execute a performance of said performance parts based on the read-out first automatic performance data;

second performance means for reading out said second automatic performance data from said storage means in order of event occurrence, to execute a performance based on the read-out second automatic performance data, said second automatic performance data being read out simultaneously in parallel with said first automatic performance data; and mute means for, when said second performance means executes the performance based on said second automatic performance data, muting the performance of at least one of the accompaniment parts of said first automatic performance data read-out by said first performance means while said first performance means continues reading out said first automatic performance data.

2. An automatic performance device as defined in claim 1 wherein information designating the performance part to be muted by said mute means is contained in said first automatic performance data.

3. An automatic performance device as defined in claim 1 which further comprises a part-selecting operating member for selecting the performance part to be muted by said mute means.

4. An automatic performance device as defined in claim 1 which is capable of making a selection as to whether or not a performance by said second performance means is to be executed.

5. An automatic performance device as defined in claim 1 wherein when said second performance means executes the performance based on said second automatic performance data, said mute means is capable of making a selection as to whether or not a performance for a predetermined performance part of said first automatic performance data is to be muted.

6. An automatic performance device as defined in claim 1 wherein when the performance part to be muted is changed from one performance part to another, said mute means mutes the performance part of said second automatic performance data that corresponds to said one performance part.

7. An automatic performance device as defined in claim 1 wherein the performance part of said first automatic performance data to be muted by said mute means corresponds to the performance part of said second automatic performance data.

8. An automatic performance device comprising:

style data storage means for storing automatic accompaniment pattern data for each of a plurality of performance styles;

performance data storage means for storing automatic performance data containing pattern designation information that designates which of the performance styles are to be used;

first performance means for reading out the automatic performance data from said performance data storage means to execute a performance based on the read-out automatic performance data;

conversion means for converting the pattern designation information read out by said first performance means into other pattern designation information, and second performance means for reading out the automatic accompaniment pattern data from said style data storage means in accordance with the other pattern designation information converted by said conversion means, to execute a performance based on the read-out automatic accompaniment pattern data.

9. A method of processing automatic performance data to execute an automatic performance by reading out data from a storage device which stores first automatic performance data for first and second performance parts and second automatic performance data for said second performance part, said method comprising the steps of:

reading out said first automatic performance data from said storage device, and performing said first and second performance parts on the basis of said read-out first automatic performance data when the automatic performance is to be executed by a first-type automatic performance device capable of processing only said first automatic performance data, and reading out said first and second automatic performance data from said storage device, and performing said first performance part on the basis of said read-out first automatic performance data and also performing simultaneously said second performance part on the basis of said read-out second automatic performance data when the automatic performance is to be executed by a second-type automatic performance device capable of processing said first and second automatic performance data.

10. A method as defined in claim 9 wherein said first automatic performance data is song data containing performance data of a music piece from beginning to end thereof, and said second automatic performance data is performance pattern data for one or more measures that is performed repeatedly.

11. A method as defined in claim 9 wherein said storage device stores a plurality of sets of said second automatic performance data, and said first automatic performance data contains designation data to designating any of the sets of said second automatic performance data.

12. A method as defined in claim 11 wherein the set of said second automatic performance data to be designated by the designation data is variable.

* * * * *